United States Patent [19]
Rhody

[11] Patent Number: 5,503,534
[45] Date of Patent: Apr. 2, 1996

[54] AUTOMOTIVE DRIVE CONTROL FOR HYDROSTATIC TRANSMISSION

[75] Inventor: Karl-Thomas Rhody, Boostedt, Germany

[73] Assignee: Eaton Corporation, Cleveland, Ohio

[21] Appl. No.: 405,130

[22] Filed: Mar. 16, 1995

[51] Int. Cl.⁶ ..................................... F04B 1/26
[52] U.S. Cl. .................... 417/218; 417/222.1; 60/444
[58] Field of Search ..................... 417/212, 217, 417/218, 214, 222.1; 60/444, 447, 449

[56] References Cited

U.S. PATENT DOCUMENTS

| | | | |
|---|---|---|---|
| 4,368,798 | 1/1983 | Meyerle et al. | 60/444 X |
| 4,382,360 | 5/1983 | Dummer | 60/444 |
| 4,388,941 | 6/1983 | Riedhammer | 137/82 |
| 4,478,041 | 10/1984 | Pollman | 60/444 |
| 4,495,767 | 1/1985 | Akiyama et al. | 60/444 X |
| 4,559,778 | 12/1985 | Krusche | 417/217 X |
| 4,747,746 | 5/1988 | Geringen | 60/447 |
| 5,108,267 | 4/1992 | Horst | 417/218 |
| 5,271,722 | 12/1993 | Hansell | 417/278 |

*Primary Examiner*—Richard E. Gluck
*Attorney, Agent, or Firm*—L. J. Kasper

[57] ABSTRACT

A control (27) is disclosed which may be used as an automotive drive control for a variable displacement hydrostatic pump (11). The pump displacement is controlled by servos (37, 39) by control pressure from a charge pump (21). As a pedal (P) of a vehicle engine (E) is depressed, an increasing pressure differential across a fixed orifice (79) moves a control spool (73) to port control fluid to a first servo port (A). If engine speed becomes excessive, or in response to an external pressure signal (121) representing another vehicle condition, the control spool (73) is moved to a position (FIG. 5) in which control pressure is ported to a second servo port (B), thus positively reducing the displacement of the pump (11).

12 Claims, 4 Drawing Sheets

AUTOMOTIVE DRIVE CONTROL FOR HYDROSTATIC TRANSMISSION

BACKGROUND OF THE DISCLOSURE

The present invention relates to hydrostatic transmissions for vehicles, and control systems therefor, and more particularly, to such control systems which permit the vehicle operator to drive the vehicle in the manner of an automobile, such control systems being referred to as "automotive drive controls".

Although the present invention may be used with various types of variable displacement pumps, wherein the displacement of the pump is controlled by a fluid pressure actuated servo mechanism, the invention is especially suited for use with axial piston pumps of the swashplate-type, and will be described in connection therewith.

It has been well known in the art for many years to vary the displacement of an axial piston pump of the swashplate-type by porting fluid under pressure ("control pressure") to either of two servos having pistons attached to the swashplate. The control of such control fluid is governed typically by a control valve having a control spool which has a feedback linkage connected to the swashplate, or to the servos. Such control valves are typically referred to as "manual controllers", because the position of the swashplate ultimately corresponds to the position of a manual control handle.

More recently, there has been an increasing desire on the part of the vehicle manufacturers to enable the vehicle operator to drive the vehicle in a manner which is more familiar to the typical vehicle operator, i.e., in a manner similar to driving an automobile. Therefore, those working in the hydrostatic transmission art have developed "automotive drive controls", whereby the vehicle operator controls the displacement of the pump, and therefore, the speed of the vehicle, by means of the accelerator pedal associated with the vehicle engine.

The provision of such automotive drive controls has generally represented an improvement in the vehicles equipped with such controls, primarily because a vehicle equipped with an automotive drive control can be driven by an operator having a lower level of skill and training than what is required to drive a vehicle on which the hydrostatic transmission includes a conventional manual controller. Furthermore, it is generally agreed that the presence of an automotive drive control reduces the fatigue level of the operator, and permits greater overall productivity on the part of the operator.

In general, automotive drive controls make it possible for the vehicle manufacturer to tailor the vehicle drive performance to the torque curve of the engine. For example, an automotive drive control allows the engine to idle, thus saving engine horsepower and fuel, when power is not needed by the vehicle.

Typical examples of vehicles equipped with an automotive drive control would include industrial vehicles, such as fork lift trucks, and construction vehicles, such as front end loaders. It is quite common for such vehicles to operate in hilly terrain (for example, a front end loader operating in a gravel pit), or to operate in a situation where it is desirable to limit the vehicle's speed when the vehicle is more heavily loaded (for example, a fork lift truck traveling with a heavy load on the forks with the forks raised). One of the shortcomings of the prior art automotive drive controls has been an inability to operate in a desirable manner under conditions such as those described above.

In a typical automotive drive control, control pressure to the servos of the pump is proportional to engine speed, with engine speed typically being determined by sensing a pressure differential across a fixed orifice disposed on the outlet side of the source of control pressure (for example, the charge pump). Unfortunately, as the vehicle passes over the top of a hill, and begins to travel downhill, engine speed will tend to increase because of the reduced load on the engine, thus increasing control pressure and pump displacement which, in turn, further increases vehicle speed at a time when increasing the vehicle speed is clearly not desirable.

The "overspeed" problem described above is made worse by the fact that most vehicles equipped with automotive drive controls are also equipped with diesel engines. As is well known to those skilled in the art, the braking torque of a diesel engine is typically only about 30% of the driving torque of the engine. In other words, a typical diesel engine does not provide the type of dynamic braking which would help to alleviate the "overspeed" problem. Furthermore, in the downhill condition described above by way of example only, the momentum of the vehicle will cause the motor of the hydrostatic transmission to be driven and act like a pump, pumping fluid to the pump of the hydrostatic transmission, which will then act as a motor, driving the vehicle engine even faster.

SUMMARY OF THE INVENTION

Accordingly, it is an object of the present invention to provide an improved control for a device having first and second servos, wherein the control normally ports fluid to the first servo, but can port fluid to the second servo when a predetermined vehicle condition occurs.

It is another and more specific object of the present invention to provide an improved automotive drive control which will overcome the above-described problem of the vehicle engine overspeeding as the vehicle begins to travel downhill, making control of the vehicle more difficult for the operator.

It is a further object of the present invention to provide such an improved automotive drive control which is capable of positively reducing the displacement of the pump of the hydrostatic transmission, in response to an impending overspeed condition.

DESCRIPTION OF THE PREFERRED EMBODIMENT

Figure 1:
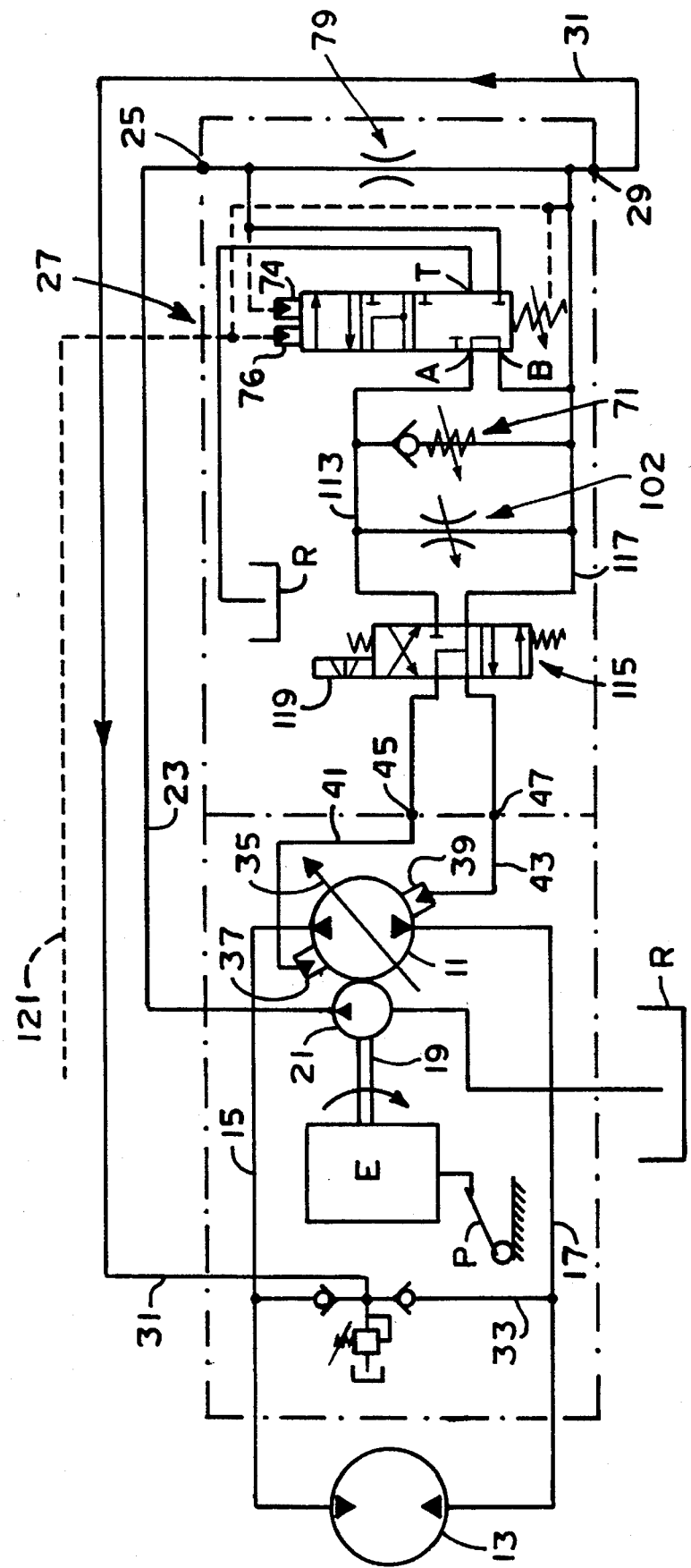
FIG. 1 is a hydraulic schematic of a hydrostatic transmission and automotive drive control system made in accordance with the present invention.

Referring now to the drawings, which are not intended to limit the invention, FIG. 1 illustrates, schematically, a hydrostatic transmission of the type which is generally well known, and is sold commercially by the assignee of the present invention, but which includes the novel automotive drive control of the present invention. The transmission shown schematically in FIG. 1 includes a variable displacement, swashplate-type axial piston pump 11 hydraulically coupled to a fixed displacement, swashplate-type axial piston motor 13 by means of fluid conduits 15 and 17.

The pump 11 receives input drive torque from the vehicle engine E, by means of an input shaft 19, which drives the rotating group of the pump 11 in a manner well known in the art. The speed of the engine is controlled by means of an accelerator pedal P, in a manner well known in the automotive art, but now also well known in the hydrostatic transmission art. The input shaft 19 also drives a charge pump 21 which is hydraulically coupled to the conduits 15 and 17 to supply "make-up" fluid to whichever of the conduits 15 or 17 is the "low pressure" side of the circuit. The output side of the charge pump 21 communicates by means of a fluid conduit 23 with an inlet port 25 of an automotive drive control, generally designated 27 (referred to sometimes hereinafter as "drive control 27"). The drive control 27 includes an outlet port 29 which is in fluid communication, by means of a fluid conduit 31, with a conduit 33 which interconnects the fluid conduits 15 and 17. Thus, control pressure is communicated from the charge pump 21 by means of the fluid conduit 23, through the drive control 27, and then through one branch or the other of the conduit 33 to the low pressure side of the circuit.

The pump 11 further includes a swashplate 35 which is moveable overcenter by means of a pair of stroking cylinders (servos) 37 and 39. The stroking cylinders 37 and 39 are hydraulically coupled by means of fluid conduits 41 and 43, respectively, to control ports 45 and 47, respectively, of the automotive drive control 27. On many axial piston pumps, the stroking cylinders 37 and 39 literally comprise two separate cylinders, disposed at opposite ends of the swashplate 35. Alternatively, the stroking cylinders 37 and 39 could comprise the opposite chambers defined by a single servo piston disposed within a cylinder. However, the use of the present invention is not limited to a pump and servo cylinder combination, but may be used with any type of device which is controlled by some sort of "servo" arrangement which is operable, normally, to move or displace the device in a first direction, but wherein, under certain conditions, it is desirable to move the device in a second, opposite direction.

Figure 2:
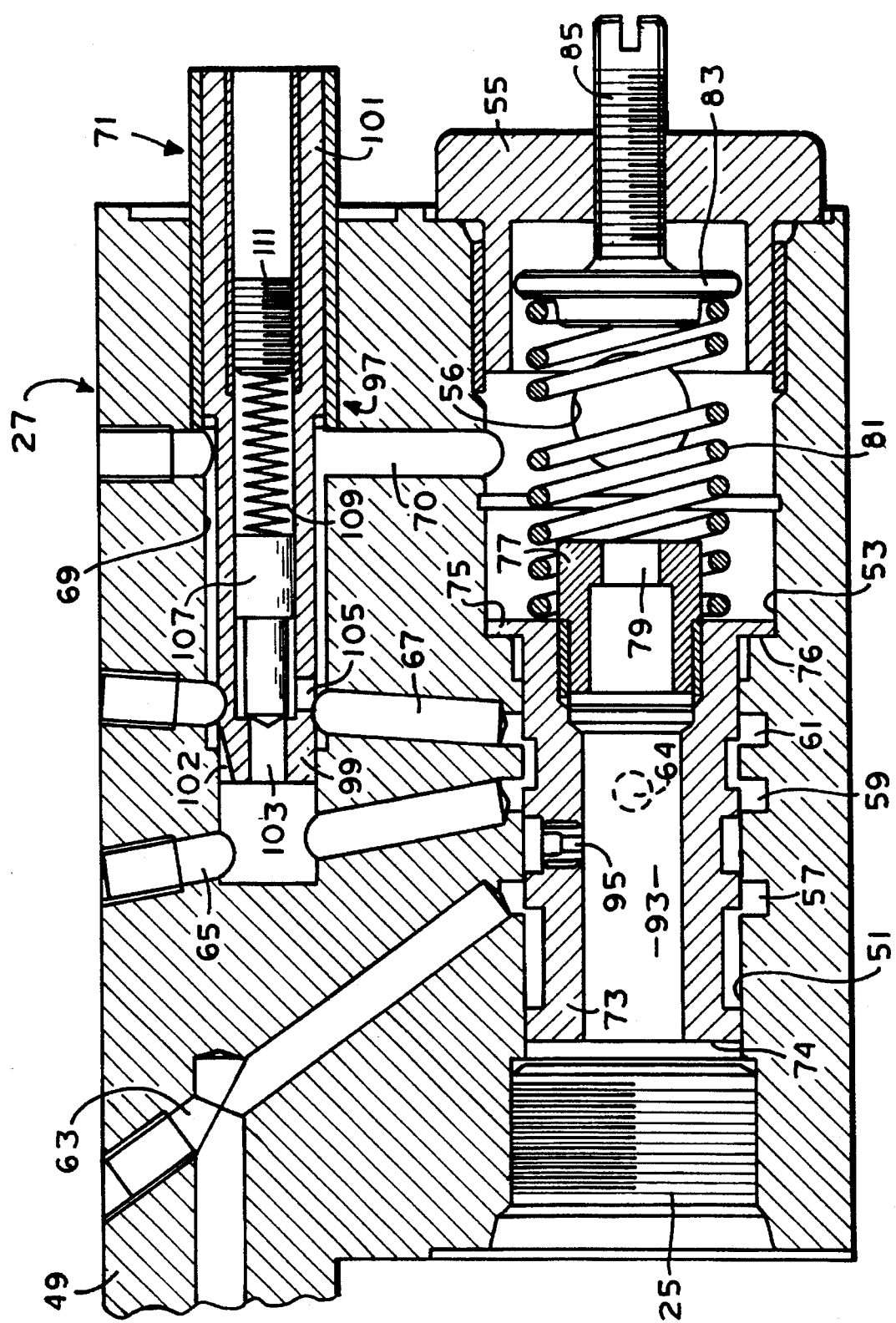
FIG. 2 is an axial cross-section of the automotive drive control valve shown schematically in FIG. 1, and in the closed position shown schematically in FIG. 1.

Referring now primarily to FIG. 2, the automotive drive control 27 will be described in some detail. The drive control 27 includes a valve housing 49 which defines the inlet port 25, and in open communication therewith, a spool bore 51 which opens into a spring chamber 53. The right end of the spring chamber 53 is internally threaded, and receives therein an externally threaded plug member 55. The spring chamber 53 is in communication with the outlet port 29 through a bore 56, defined by the housing 49. To facilitate viewing the bore 56, one turn of the spring in front of the bore 56 has been removed in FIG. 2.

The valve housing 49 and spool bore 51 cooperate to define a series of annular grooves 57, 59, and 61. The groove 57 is in communication with a tank port T by means of a drilled passage 63. The annular groove 59 communicates with a first servo port A by means of a bore 64 defined by the housing 49, the bore 64 being shown only in dotted line form in FIG. 2 because it is "behind" structure to be introduced subsequently. Also connected to the annular groove 59 is a drilled passage 65. Finally, the annular groove 61 communicates with a second servo port B by means of a drilled passage 67, a stepped spool bore 69 which intersects the drilled passages 65 and 67, then by means of a drilled passage 70. The drilled passage 70 opens into the spring chamber 53 and permits fluid communication with the bore 56 which, in turn, is in fluid communication with the servo port B. Disposed within the stepped spool bore 69 is a servo pressure differential adjustment assembly, generally designated 71, which will be described in greater detail subsequently.

Referring still primarily to FIG. 2, disposed within the spool bore 51 and slidable therein, is the main drive control spool 73, which defines a first transverse surface 74, and includes a radially-extending flange 75, defining a second transverse surface 76. The transverse surfaces 74 and 76 are shown schematically in FIG. 1 in a manner which will be readily understood by those skilled in the art. With the control spool 73 in the closed position shown in FIG. 2, the flange 75 is seated against a shoulder defined at the junction of the spool bore 51 and spring chamber 53, but as the spool 73 is displaced from the closed position, there is formed a signal chamber or pressure chamber 76c. The input signal to the pressure chamber 76c will be described subsequently. Threaded into the right end of the spool 73 is an orifice member 77 which defines a fixed flow orifice 79, also shown schematically in FIG. 1.

Disposed within the spring chamber 53 is a coil compression spring 81, the left end of which in FIG. 2 is disposed about the orifice member 77 and seats against the flange 75. The right end of the spring 81 is received within the plug member 55, and is seated against a seat member 83 which is formed integrally with an externally threaded threshold adjusting member 85. The member 85 is in threaded engagement with the plug member 55, such that rotation of the member 85 results in axial displacement of the seat member 83, in one direction or the other, depending upon the direction of rotation of the adjusting member 85. The function of the threshold adjustment achieved by the member 85 will be described subsequently.

Figure 3:
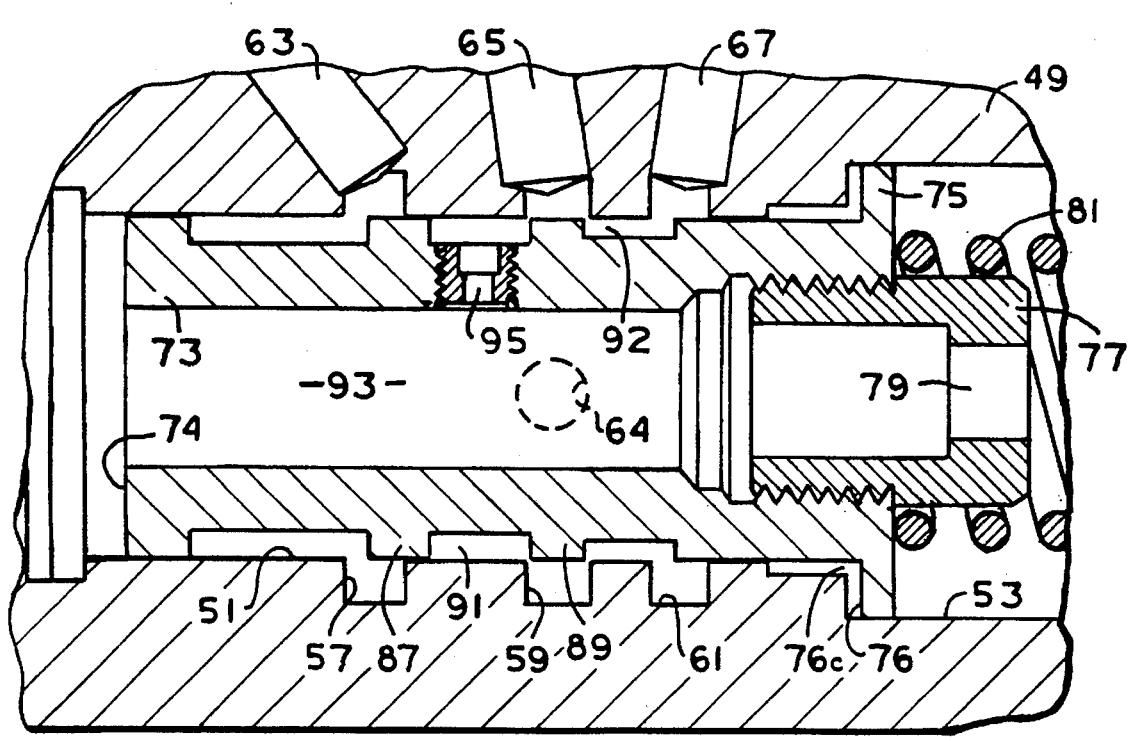
FIG. 3 is an enlarged, fragmentary axial cross-section, similar to FIG. 2, illustrating the automotive drive control approaching the normal driving condition.

Referring now to FIG. 2, in conjunction with FIG. 3, the drive control spool 73 includes a spool land 87 and a spool land 89, and disposed axially therebetween, the spool 73 defines an annular groove 91. Disposed to the right of the spool land 89 in FIG. 3, the spool 73 also defines an annular groove 92 which, in the positions shown in FIGS. 2 and 3 is in communication with the annular groove 61 defined by the housing 49. The control spool 73 defines a central flow passage 93, by means of which fluid entering the inlet port 25 can flow through the fixed orifice 79. A portion of the fluid flowing through the passage 93 may be communicated to the annular groove 91 by means of a radial bore in which is disposed a flow orifice member 95 (not shown schematically in FIG. 1). It should be understood that the present invention is not limited to a control in which the flow through the fixed orifice 79 first flows through the control spool 73. Instead, within the scope of the invention, the control spool may be solid and the fixed orifice 79 may be located elsewhere, for example, near the outlet of the charge pump 21. In that case, it would be necessary to communicate pressure signals from upstream and downstream of the orifice 79 to chambers at the left and right ends, respectively, of a solid control spool. In such a "solid" control spool, there would preferably still be a central passage communicating from the left end of the spool to the flow orifice member 95, but the passage would be "blind", i.e., it would not extend axially through to the right end of the spool.

Referring again primarily to FIG. 2, but now in conjunction with FIG. 1, the servo pressure differential adjustment assembly 71 will be described in greater detail. The assembly 71 includes an adjustment spool 97 including a relatively smaller spool portion 99, and a relatively larger spool portion 101. The spool portion 99 defines a characteristic adjustment notch 102 which permits a small amount of fluid communication from the annular groove 59, by means of the drilled passage 65, to the spool bore 69, and then to the second servo port B in the manner described previously. The larger spool portion 101 is externally threaded for threaded engagement with internal threads defined by the mating portion of the stepped spool bore 69. The smaller spool portion 99 defines an axial bore 103, communicating between the interior of the spool portion 99 and the drilled passage 65. The smaller spool portion 99 further defines a radial passage 105, capable of providing fluid communication between the interior of the spool portion 99 and the drilled passage 67, under conditions to be described subsequently.

Disposed within the spool portion 99 is a servo pressure differential spool 107, which is biased toward the position shown in FIG. 2 by means of a compression spring 109. The right end of the spring 109 is seated against an externally-threaded setting assembly 111, which preferably comprises two separate members, the first one to set the position of the spring 109, and the second one to lock the position of the first one.

As may be seen in FIG. 1, the first servo port A communicates by means of a servo line 113 with an inlet of a directional control valve, generally designated 115. The second servo port B communicates by means of a servo line 117 with an outlet port of the directional control valve 115. The details of the directional control valve 115 do not form an essential part of the present invention, and therefore, are illustrated only schematically herein. In the subject embodiment, the control valve 115 is spring biased toward the neutral position shown in FIG. 1, and is displaced from the neutral position by means of a solenoid 119. With the solenoid actuated to move the valve 115 up in FIG. 1, the servo port A is in communication, by means of the servo line 113 and the fluid conduit 41, with the stroking cylinder 37, while the servo port B is in communication, by means of the servo line 117 and the fluid conduit 43, with the stroking cylinder 39. Therefore, the function of the adjustment assembly 71 is to limit the pressure differential across the servos 37 and 39, and the setting assembly 111 may be adjusted, by threading it further in (to the left in FIG. 2) or backing it out, to vary the maximum pressure differential between the servo ports A and B as well as between the servos 37 and 39. While the adjustment assembly 71 is limiting the maximum pressure differential which can exist between the servo ports, the function of the characteristic adjustment notch 102 is to control the rate of change of the pressure differential between the servo ports (i.e., the "gain"). For example, if the adjustment spool 97 is threaded out, further to the right from the position shown in FIG. 2, the notch 102 will be more open to the spool bore 69, thus decreasing the gain or the responsiveness of the control 27 (i.e., requiring more time to build a pressure differential between the servo ports).

Referring again primarily to FIG. 2, when the vehicle engine E is at idle, and there is only minimum flow of control pressure through the fluid conduit 23 and through the fixed orifice 79, the main drive control spool 73 is biased by the spring 81 to the "closed" position shown in FIG. 2. In the closed position, the central flow passage 93 is blocked from communication with the groove 59 by means of the spool land 89, while communication with the groove 57 is blocked by the spool land 87.

Referring now primarily to FIG. 3, as the vehicle operator depresses the pedal P, and the speed of the engine E begins to increase above idle speed, the flow across the fixed orifice 79 increases, as does the pressure drop across the orifice 79. The increasing pressure drop (shown schematically as acting on the first transverse surface 74), begins to overcome the force of the spring 81 and move the spool 73 to the right in FIG. 3 to a position in which the annular groove 91 begins to meter control pressure to the annular groove 59, and therefore, through the bore 64 to the servo port A. As control pressure is communicated to the servo port A, it is then communicated to the servo 37 in the manner described previously, thus increasing the displacement of the swashplate 35 in a manner well known to those skilled in the art. The position of the control spool 73 shown in FIG. 3 is considered the "normal" driving position. It is worth noting here, and it may be seen schematically in FIG. 1, that the only "input" which determines the displacement of the pump 11 in the normal driving mode is the rate of flow of control fluid, and therefore, the pressure drop across the orifice 79. However, in other positions of the control spool 73, there may be an additional input, such as a pressure signal communicated to the pressure chamber 76c, as will be described subsequently.

The particular speed of the engine E corresponding to the movement of swashplate 35 from its centered, neutral position to a displaced position is determined by the setting of the threshold adjustment member 85. In other words, if the member 85 and the seat member 83 were adjusted to the left in FIG. 2, thus increasing the biasing force of the spring 81 against the control spool 73, a higher engine speed would be required in order to achieve movement of the swashplate 35 from its neutral, zero displacement position to a positive, displaced position. As the engine speed continues to increase, the control spool 73 moves further to the right in FIG. 3, thus increasing the communication of control pressure through the orifice member 95 and annular groove 91 to the annular groove 59 and from there to the servo port A. However, because of the characteristic adjustment notch 102, the pressure differential between the servos increases only gradually as the control spool 73 is biased further to the right with increasing engine speed, until the swashplate 35 achieves its maximum displacement with the annular groove 91 fully overlapping and communicating with the annular groove 59 (a position of the spool 73 somewhere between the positions of FIGS. 3 and 4).

Referring again to FIG. 1, a pressure signal 121 is illustrated schematically as being in communication with the pressure chamber 76c, thus exerting a biasing force on the second transverse surface 76. Although not an essential feature of the present invention, the pressure signal 121 may be used advantageously as an additional input, to assist in biasing the control spool 73 to the right in FIGS. 2–4. The pressure signal 121 may represent any vehicle function or characteristic which would indicate a need for a reduction of the speed of the vehicle, even at a time when the speed of the engine E may still be increasing. In the subject embodiment, and by way of example only, if the automotive drive control 27 is being used on a construction vehicle such as a loader, the signal 121 may comprise a pressure override signal, i.e., a signal indicating that the maximum desired pressure differential between the fluid conduits 15 and 17 has been exceeded. Alternatively, if the automotive drive control 27 of the present invention is being used on an industrial vehicle such as a forklift truck, the pressure signal 121 may be representative of the load on the forks, and it is in connection with such an embodiment that FIGS. 4 and 5 will be described.

Figure 4:
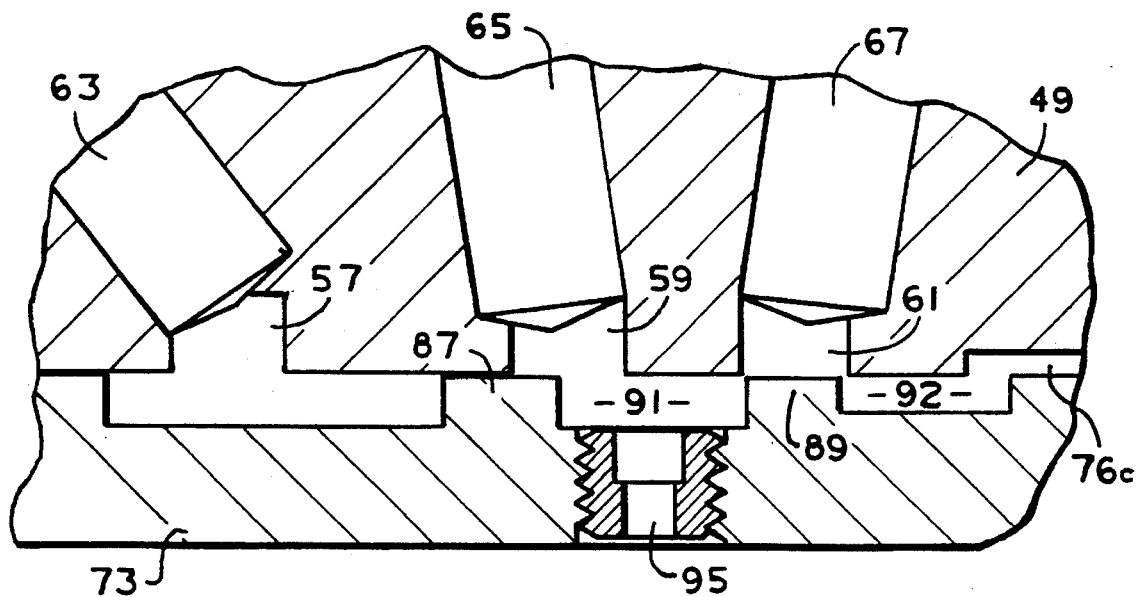
FIG. 4 is a further enlarged, fragmentary axial cross-section, similar to FIG. 3, illustrating the automotive drive control in the speed limiting or deceleration position.

Referring now primarily to FIG. 4, if the vehicle operator would continue to depress the pedal P, causing the speed of the engine E to increase further, or if the pressure signal 121 would increase, indicating an increase in the load on the forks, the control spool 73 would be moved to the position shown in FIG. 4. As the control spool 73 moves from the position shown in FIG. 3 to that shown in FIG. 4, the annular groove 91 traverses the annular groove 59 until, in the position shown in FIG. 4, the annular groove 91 begins to communicate with the annular groove 61, thus effectively "cross-porting" the annular grooves 59 and 61, and therefore, the servo ports A and B and the servos 37 and 39. Thus, the displacement of the swashplate 35 may begin to decrease from the maximum displacement position occurring intermediate the FIG. 3 and FIG. 4 positions or, at least, will not increase any further even as control pressure upstream of the orifice 79 increases.

As may be seen in FIG. 4, the spool land 89 is in a position in which control pressure fluid is metered from both the annular groove 59 and the flow orifice 95 to the annular groove 61, while at the same time, the pressure signal 121 is metered from the chamber 76c through the annular groove 92 to the annular groove 61. The position of the control spool 73 as shown in FIG. 4 is referred to as the speed-limiting or "deceleration" position because, when the spool 73 reaches the FIG. 4 position, the pump 11 begins to destroke. Furthermore, whenever the pressure signal 121 reaches a level such that it biases the control spool 73 to the FIG. 4 position, the particular vehicle condition corresponding to that particular signal 121 serves to limit the speed of the vehicle, or perhaps even reduce the speed of the vehicle.

It should be understood that, alternatively, the position shown in FIG. 4 may be a transition condition which occurs when the vehicle begins to go downhill, thus substantially reducing the load on the engine and permitting the engine speed to increase substantially. As was mentioned in the BACKGROUND OF THE DISCLOSURE, when the vehicle begins down a slope or down a hill, the motor acts as a pump and communicates pressurized fluid to the pump, which then acts as a motor, driving the engine even faster and causing the spool 73 to be biased to the FIG. 4 position. However, once the spool 73 reaches the FIG. 4 position, no further increase in displacement of the pump 11 will occur, and the swashplate 35 may even begin to destroke somewhat.

Figure 5:
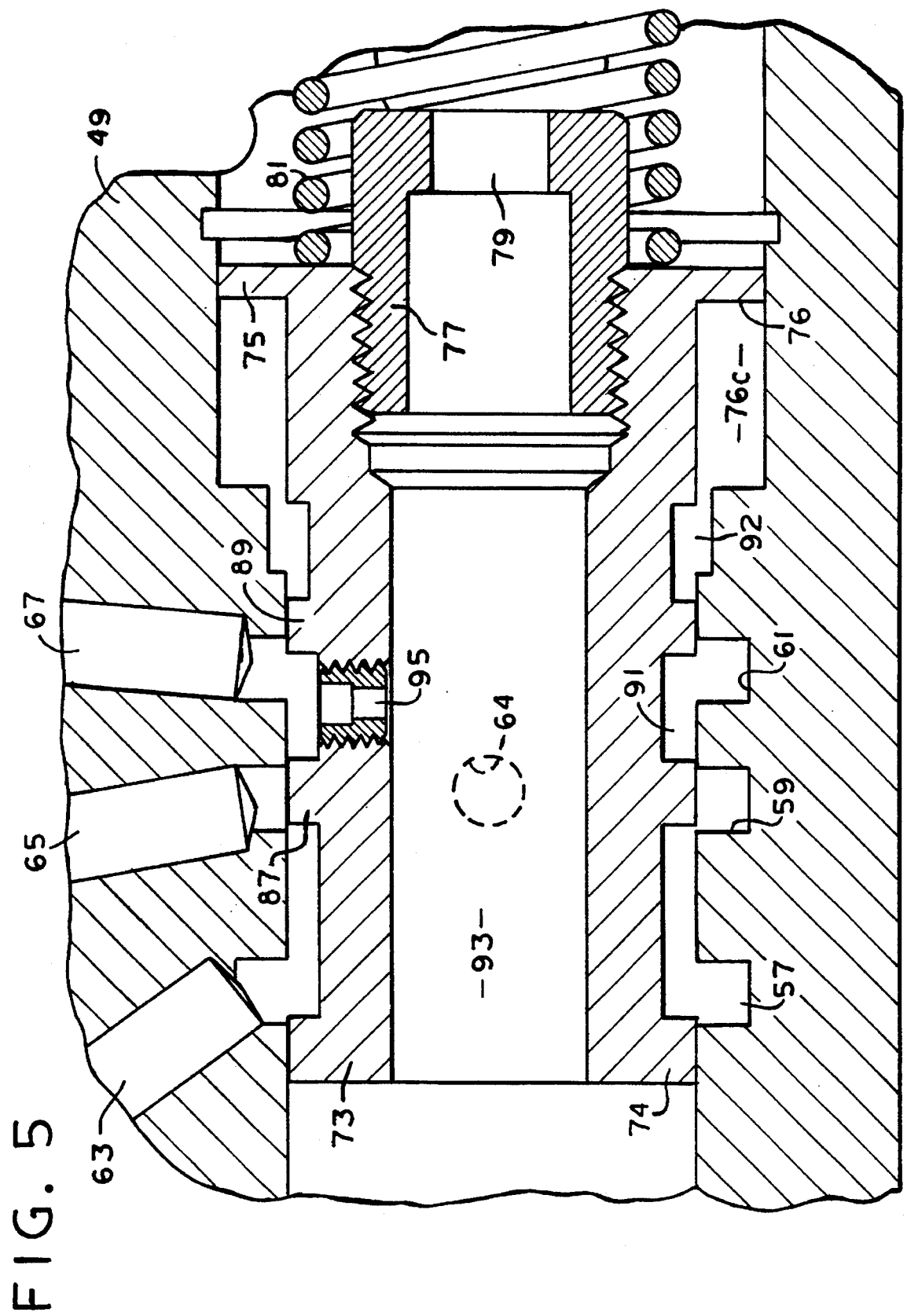
FIG. 5 is a somewhat enlarged, fragmentary axial cross-section, similar to FIGS. 3 and 4, illustrating the automotive drive control in the automatic braking or overspeed condition.

Referring now primarily to FIG. 5, if the pressure signal 121 increases to a level greater than that corresponding to the FIG. 4 position, or if the downhill travel of the vehicle results in the speed of the engine E increasing further, the control spool 73 is moved even further to the right. With the spool 73 in the position shown in FIG. 5, the spool land 87 blocks fluid communication through the orifice 95 to the annual groove 59, but opens up the communication between the annular groove 91 and the annular groove 61. At the same time, the spool land 89 now blocks communication between the pressure chamber 76c and the annular groove 61. As a result, control pressure is directed into the annular groove 61, and from there, to the second servo port B in the manner described previously. The position of the control spool 73 shown in FIG. 5 is referred to as the "overspeed" position, referring to the situation where the engine overspeeds. In this overspeed position, control pressure is communicated to the servo 39, while at the same time, the servo 37, still connected to the first servo port A, has its pressure drained from the annular groove 59 past the spool land 87 to the annular groove 57, and out to the tank port T. As a result, in the overspeed position of the control spool 73, the swashplate 35 is positively driven toward the neutral position. The decreasing pump displacement causes the speed of the engine to decrease which, in turn, causes the control spool 73 to move back toward the FIG. 4 position. If the vehicle is still moving downhill, the result might be another overspeed condition, with the control spool 73 again moving to the FIG. 5 position, followed by destroking of the pump 11, as described previously, and the control spool 73 again moving toward the FIG. 4 position. In other words, with the vehicle in a downhill situation, the automotive drive control 27 may "cycle" in much the manner of an anti-skid brake system, although at a much lower frequency, to maintain control of the vehicle.

As will be understood by those skilled in the art, as the control pressure is ported to the second servo port B, and to the servo 39, the resulting positive destroking of the pump 11 offers resistance to the "pumping" of fluid by the motor 13, thus providing a form of hydrostatic braking.

In the case of a vehicle application for the drive control 27 in which there is an input pressure signal 121 to the chamber 76c, such as the load on the forks of a forklift truck, the drive control 27 would typically not cycle in the manner described above for the downhill operation, but instead, for a constant pressure signal 121, the control 27 would merely serve to limit the displacement of the pump 11. For example, with no load on the forks, the pump 11 could reach the maximum displacement of the swashplate 35 but, by way of example only, with a load of at least a predetermined amount on the forks, the control 27 could be set up to limit the displacement of the swashplate 35 to about two-thirds of its normal, maximum displacement.

Although the typical application of the automotive drive control 27 would be in connection with a pump of the over-center type, such is not essential to the present invention, especially in view of the fact that, typically, the pump swashplate 35 is merely driven toward the neutral position when the control pressure is ported to the servo 39. In other words, the pump normally is not actually driven all the way over-center into a reverse displacement position.

It should also be understood that the external pressure signal 121 which, in some embodiments of the invention would be communicated to the pressure chamber 76c, does not have to be a precisely controlled signal for purposes of the present invention. In other words, the signal 121 may simply comprise the hydraulic "muscle" which shifts the control spool 73 to the FIG. 4 position and/or the FIG. 5 position. There does not have to be any particular linear relationship between the signal 121 and the particular operating condition or vehicle characteristic represented by the signal 121. In fact, in certain situations, the signal 121 may merely be an "ON/OFF" type of signal.

Although the present invention has been described in connection with an embodiment in which the control spool 73 is positioned in response to changes in the speed of the vehicle engine E, the invention is not so limited. Those skilled in the art will understand that other predetermined vehicle conditions, and changes therein, could be used to position the spool 73. All that is necessary is that the changes in the predetermined vehicle condition be used to generate a pressure signal, or a pressure differential, across the spool 73. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. An automotive drive control for a hydrostatic variable displacement pump adapted to be driven by an engine, said pump including a source of control pressure and first and second fluid pressure actuated servos for varying the displacement of said pump in first and second opposite directions, respectively, in response to the presence of control pressure therein; said automotive drive control comprising a valve housing defining an inlet port in fluid communication with said source of control pressure, and first and second servo ports in fluid communication with said first and second fluid pressure actuated servos, respectively, and a tank port in fluid communication with a source of relatively low pressure fluid; said valve housing further defining a valve bore in open communication with said inlet port, said first and second servo ports, and said tank port; a control spool disposed in said valve bore for movement therein, and means biasing said valve spool toward a low speed position (FIG. 2) in which said valve spool blocks fluid communication from said inlet port, to said first and second servo ports and to said tank port; said automotive drive control further comprising means operable to generate a fluid pressure signal representative of the speed of said engine, to bias said control spool in opposition to said biasing means toward a normal driving position; said control spool being configured such that:

(a) at an intermediate engine speed, said means to generate a fluid pressure signal biases said control spool to said normal driving position (FIG. 3) in which said inlet port is in fluid communication with said first servo port and said inlet port is blocked from fluid communication with said second servo port and said tank port; and (b) at a relatively high engine speed, said means to generate a fluid pressure signal biases said control spool toward a high speed position (FIG. 5) in which said inlet port is in fluid communication with said second servo port, and said first servo port is in fluid communication with said tank port.

2. An automotive drive control (27) as claimed in claim 1, characterized by said control spool comprising a generally hollow valve spool (73), and fluid from said source (21) of control pressure flows through said hollow valve spool (73).

3. An automotive drive control as claimed in claim 2, characterized by said means operable to generate a fluid pressure signal comprises a flow orifice associated with said control spool and said fluid from said source of control pressure flowing through said hollow valve spool flows through said flow orifice, whereby said control spool is subjected to a pressure differential representative of the speed of said engine.

4. An automotive drive control as claimed in claim 1, characterized by said control spool being configured such that, at an engine speed greater than said intermediate engine speed, but less than said relatively high engine speed, said means to generate a fluid pressure signal biases said control spool to a deceleration position (FIG. 4) in which said first servo port is in fluid communication with said second servo port.

5. An automotive drive control as claimed in claim 4, characterized by, in said deceleration position (FIG. 4), said inlet port is in fluid communication with both said first and said second servo ports.

6. An automotive drive control as claimed in claim 1, characterized by said control spool and said valve housing cooperating to define a pressure chamber adapted to receive a pressure signal representative of a predetermined vehicle condition; said control spool being configured such that the presence of said pressure signal in said pressure chamber biases said control spool toward said relatively high speed position (FIG. 5).

7. An automotive drive control as claimed in claim 1, characterized by the inclusion of means operable to limit the fluid pressure differential between said first and said second servo ports, and of means operable to control the rate of increase of the fluid pressure differential between said first and said second servo ports.

8. A control for a device adapted to receive an input, said device including a source of control pressure and first and second fluid pressure actuated servos for actuating the device in first and second opposite directions, respectively, in response to the presence of control pressure therein; said control comprising a valve housing defining an inlet port in fluid communication with said source of control pressure, and first and second servo ports in fluid communication with said first and second fluid pressure actuated servos, respectively, and a tank port in fluid communication with a source of relatively low pressure fluid; said valve housing further defining a valve bore in open communication with said inlet port, said first and second servo ports, and said tank port; a control spool disposed in said valve bore for movement therein, and means biasing said valve spool toward a first position (FIG. 2) in which said valve spool blocks fluid communication from said inlet port to said first and second servo ports and to said tank port; said control further comprising means operable to generate a fluid pressure signal representative of a predetermined vehicle condition, to bias said control spool in opposition to said biasing means toward a second position; said control spool being configured such that:

(a) at an intermediate vehicle condition, said means to generate a fluid pressure signal biases said control spool to a second position (FIG. 3) in which said inlet port is in fluid communication with first servo port and said inlet port is blocked from fluid communication with said second servo port and said tank port; and (b) at a third vehicle condition, said means to generate a fluid pressure signal biases said control spool toward a third position (FIG. 5) in which said inlet port is in fluid communication with said second servo port, and said first servo port is in fluid communication with said tank port.

9. A control as claimed in claim 8 characterized by said control spool being configured such that, at a fourth vehicle condition, intermediate said second and third vehicle conditions, said means to generate a fluid pressure signal biases said control spool toward a fourth position (FIG. 4) in which said first servo port is in fluid communication with said second servo port.

10. A control as claimed in claim 9 characterized by, in said fourth position (FIG. 4) of said control spool, said inlet port is in fluid communication with both said first and said second servo ports.

11. A control as claimed in claim 8 characterized by said control spool and said valve housing cooperating to define a pressure chamber adapted to receive a pressure signal representative of a predetermined, separate vehicle condition; said control spool being configured such that the presence of said pressure signal in said pressure chamber biases said control spool toward said third position (FIG. 5).

12. A control as claimed in claim 11 characterized by the inclusion of means operable to limit the fluid pressure differential between said first and said second servo ports, and of means operable to control the rate of increase of the fluid pressure differential between said first and said second servo ports.

* * * * *